Feb. 15, 1938.          F. M. ASHLEY          2,108,423
PIPE AND PIPE FILTER
Filed Jan. 30, 1936
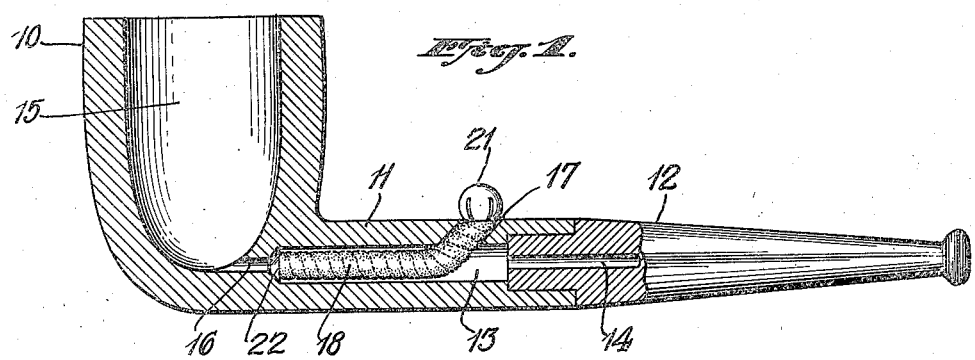
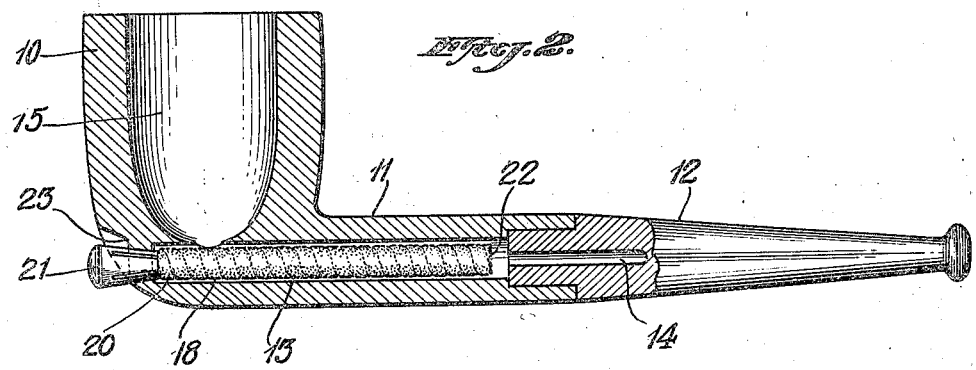
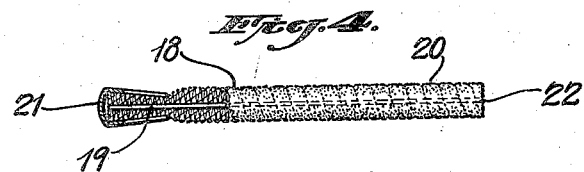
INVENTOR.

Patented Feb. 15, 1938

2,108,423

UNITED STATES PATENT OFFICE 2,108,423

PIPE AND PIPE FILTER

Frank M. Ashley, Great Kills, Staten Island, N. Y., assignor to Lewis Gompers, as trustee Application January 30, 1936, Serial No. 61,456

4 Claims. (Cl. 131—12)

My invention relates to pipes in which tobacco is smoked. The object of my invention is to provide a pipe and filter therefor whereby the smoke is filtered to extract the liquid content thereof in the act of smoking, and to provide a filter that is low in cost and that may be removed from the pipe without soiling the fingers and without removing the mouth-piece from the stem.

My present construction embodies improvements in pipes disclosed in patents heretofore granted to me and numbered respectively 1,708,531 and 1,749,308 allowed April 9, 1929, and March 4, 1930, respectively.

An important object of my invention is to provide a filter that is formed with one end enlarged in diameter to serve as a handle and stop to close the bore and to position the opposite end of the filter relative to the adjacent passage for smoke.

A further important object of my invention is to provide a filter that contains a volatile element or compound of mixture, such as menthol, to serve as a medicine administered in the act of smoking.

Referring to the drawing which forms a part of the specifications:

Fig. 1 is a longitudinal sectional view of a pipe embodying my invention, showing the filter extending thru the wall of the stem portion that is formed integral with the bowl.

Fig. 2 is a longitudinal sectional view of a pipe showing the filter in position after having been inserted from the bowl end of the pipe.

Fig. 3 is a view, partly in section, showing a thin metal ball-shaped cap which is hollow and clamped on one end of a filter.

Fig. 4 is a view of a filter shown partly in section and showing a cap of conical form fixed thereon.

Fig. 5 is a view showing the cap made of plastic material fixed thereon.

10 indicates the bowl; 11 the stem; and 12 the mouth-piece.

13 indicates an enlarged bore which extends thru the greater portion of the stem and is in open communication with the passage 14 formed in the mouth-piece and of much less diameter than that of the bore.

In Fig. 1 the bore is shown extending from the mouth-piece nearly to the bowl chamber 15 and in open communication therewith by a short passage 16 of much less diameter, to prevent tobacco from entering the bore.

17 indicates a hole, preferably formed at an angle to the bore and of somewhat less diameter.

18 indicates a filter comprising longitudinally extending thin wires on which is carried a soft absorbent material such as used in making the ordinary pipe cleaners now in general use for cleaning pipe stems.

However, any construction of filter may be used that has a stiffening member to support the filtering material, and is of the proper diameter relative to the bore in the stem.

Such a stiffening member is indicated by 19 and supports the filtering material 20, the filter being of proper diameter relative to that of the bore to permit smoke to pass freely between the outer surfaces of the filter and the adjacent wall of the bore, substantially as illustrated in the drawing.

As the warm smoke contacts the filtering material in the act of smoking the liquid content condenses and is absorbed thereby without choking the passage between the filter and the bore.

21 indicates a cap which serves as an abutment to limit the distance between the free end 22 of the filter and the adjacent passage thru which smoke passes a sufficient distance to prevent the closure of said passage.

The cap 21 may be conical in formation to perform a function of a valve and maintain the bowl end of the bore 13 free from ingress of air when the filter is positioned, as for example as shown in Fig. 2. This cap also serves as a handle to permit the filter to be removed and discarded without touching the filtering material, thus preventing the fingers from being soiled by contacting the juice from the tobacco.

The filters made for medicinal use are impregnated with menthol or other volatile materials suitable for healing mouth or nasal infections and to alleviate persons afflicted with colds, etc.

The filters prepared for medicinal use may be dipped in a solution containing the desired medicine, such as menthol which is soluble in alcohol, and allowed to dry, and in the act of smoking, the heat of the smoke causes the menthol vapors to rapidly mix with the smoke, as will be readily understood.

The use of these filters keeps the pipe in a fairly clean condition, using one after smoking each pipeful of tobacco, and under these conditions the pipe never becomes strong, and the full rich flavor of the tobacco is not spoiled by contamination of juice left in the stem from a previous smoke.

It will be observed that the caps cover the ends of the exposed portion of the filters, and project a short distance from the surface of the pipe.

In Fig. 2 I have shown the pipe cut away to provide a flat recessed surface at 23, thus allowing the cap to rest almost entirely under the bowl, and thus adding to the attractive appearance of the pipe.

Having thus described my invention I claim as new:

1. A pipe filter comprising a sheet metal substantially spherical multifingered cap, a stiffening rod, and absorbent material secured to and surrounding said rod, said fingers extending from the equatorial portion of the surface towards one of the poles thereof, the free ends thereof being in gripping engagement with the filtering material.

2. In a pipe having a bore in the stem and bowl thereof of a size slightly larger than the outside diameter of a filter to be placed therein, a filter comprising a stiffening member and filtering material carried thereby, and a cap fixedly mounted on one end of said filtering material, said cap having a substantially semispherical portion of a size to form a closure for the bowl end of the bore when the filter is placed therein, and fingers extending therefrom forming the sole means to secure the cap to the stiffening member and filtering material, said filtering material being so spaced from the inner surface of the bore as to permit smoke to pass thereabout.

3. In a pipe having a stem with a central bore of larger diameter than a filter to be placed therein, and an inclined bore in a wall of the stem of a size corresponding to the diameter of the filter to be placed in the bore, said filter having a stiffening member, a filtering material surrounding the stiffening member, and a substantially spherical cap rigidly secured about one end of the stiffening member and filtering material and having at least one transverse plane thereof of a cross section of greater area than the size of the inclined bore at the exterior wall of the stem; whereby the filter will be substantially spaced from the walls of the central bore and in sealing contact with the walls of the inclined bore.

4. In a pipe having a stem bore of a diameter greater than a diameter of a filter to be placed therein and a communicating bore in a wall of the pipe, a filter having a central stiffening element, a filtering material surrounding said stiffening element and spaced at substantially all points from the wall of the stem bore, and a fingered metal cap fixedly secured to and surrounding the stiffening member and filter and contoured to form a closure for the bore in the pipe wall, said filtering material being so positioned that a major portion of the surface thereof will be spaced from the stem bore, and said fingers being the sole means to maintain the cap in fixed relation on the stiffening member and filter.

FRANK M. ASHLEY.